United States Patent Office 3,711,496
Patented Jan. 16, 1973

---

3,711,496
4-ACYLAMINO-1,2,4-TRIAZOLE DERIVATIVES
Max Matter, Basel, and Karl Michel, Wohlen, Switzerland, assignors to Aktiebolaget Bofors, Bofors, Sweden
No Drawing. Filed Sept. 23, 1970, Ser. No. 74,921
Claims priority, application Switzerland, Sept. 24, 1969, 14,448/69
Int. Cl. C07d 55/06, 99/04
U.S. Cl. 260—308 R     6 Claims

ABSTRACT OF THE DISCLOSURE

Pharmaceutical active 4-acylamino-1,2,4-triazole derivatives having the general formula:

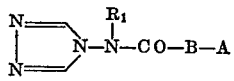

in which $R_1$ is tetrahydrofurfuryl or an alkyl having 1–4 carbon atoms, A is phenyl, naphthyl, benzylthio or benzyloxy, B is a single bond, tetrahydrofuryl-ethyl or a straight or branched alkyl having 1–5 carbon atoms.

---

The present invention relates to novel 4-acylamino-1,2,4-triazole derivatives having the general formula:

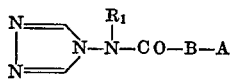

(I)

in which $R_1$ is tetrahydrofurfuryl or an alkyl having 1–4 carbon atoms, A is phenyl, naphthyl benzylthio or benzyloxy and B is a single bond, tetrahydrofurylethylene or a straight or branched alkylene with 1–5 carbon atoms.

The novel compounds have valuable pharmaceutical properties. In particular they are very active as analgetics-antiphlogistics and therefore they are very suitable for the treatment of diseases which produce information such as rheumatic affections and thrombophlebitis.

The invention also relates to a process for the preparation of the novel compounds having the above general Formula I. This process is characterized in that a 4-acylamino-1,2,4-triazole having the general formula:

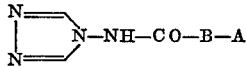

(II)

in which A and B have the above stated meanings, is alkylated at the nitrogen atom in the side chain by means of a compound that is capable of attacking the $R_1$ group which has the above stated meanings.

Compounds, which are capable of attacking the $R_1$ group are diazolalkanes or reactive esters of an alcohol having the general formula $R_1$—OH.

As such reactive esters in particular those of strong inorganic or organic acids, e.g. halogen hydracids, sulphuric acid or organic sulphonic acids, such as aryl sulphonic acids, should be mentioned.

When a diazoalkane, such as diazomethane or diazoethane is used as the alkylating agent, the reaction is carried out in an inert solvent such as methanol, ethanol, diethylether or a cyclic ether such as tetrahydrofurane, preferably at lower temperatures (about −10 - +30° C.). The reaction with the reactive esters is carried out in the usual manner in the presence of absence of diluting agents and, if desired, in the presence of basic condening agents, such, as alkali hydroxides, alcoholates, hydrides or amides. When alkylating with an ester of sulphuric acid, such as dimethyl or diethyl sulphate, or with an aryl sulphonic ester, such as p-toluenesulphonic acid-n-propyl ester, -tetrahydrofurfuryl ester or benzenesulphonic acidn-butyl ester the reaction components are preferably reacted with each other in the absence of a solvent at higher temperatures (about 100–200° C.).

The starting materials as used in the process of the invention are novel and they could be prepared by means of per se known methods.

The novel compounds may be used as medicines, e.g., in the form of pharmaceutical preparation, which contain the novel 4-acylamino-1,2,4-triazole derivatives in mixture with a pharmaceutical, organic or inorganic carrier material that is suitable for enteral, parenteral or topical administration. As the carrier material such substances as water, gelatine, milk sugar, starch, magnesium stearate, talc, vegetable oil, fenzyl alcohol, rubber, polyalkylene glycols, vaseline, cholesterol and other well-known pharmaceutical carriers could be used. The pharmaceutical preparations may be in the form of tablets, dragées, ointments, creams or in liquid form as solutions, suspensions or emulsions. They may be sterilized and/or contain adjuvants such as preservatives, stabilizing agents, humectants or emulsifiers, salts for changing the osmotic pressure or buffers. They may also contain further therapeutical substances, such as local anesthetics. The preparation of such pharmaceutical preparatives is carried out in per se known usual methods.

The invention will be explained in greater detail in the following examples.

EXAMPLE 1

To a solution of 9.1 g. (0.03 mole) of 4-[α-ethyl-α-benzylthio-n-butyryl)-amino]-1,2,4-triazol in 150 ml. tetrahydrofuran a solution of diazomethane in ether was added at 0–3° C. until the mixture became yellow. The reaction solution was placed in an ice-bath for three hours and was thereafter evaporated in a water bath, and finally in vacuo. The oily residue was dissolved in chloroform-hexane (1:4) and was filtered through ten times its weight of aluminium oxide (Woelm neutral—Akt. I). The filtrate was evaporated once again and the residue was recrystallized from 60 ml. benzene-hexane (1:2). 5.45 g. (57%) 4 - [N-(α-ethyl - α-benzylthio-n-butyl)-methylamino]-1,2,4-triazol having a melting point of 95–9° C. were obtained. After one recrystallisation from acetic ester-hexane (1:2) the melting point rose to 99–100° C.

The starting material 4-[(α-ethyl-α-benzylthio-n-butyryl)-amino]-1,2,4-triazole can be prepared in the following way: To a solution of 2.3 g. (0.1 mole) of sodium in 70 ml. of absolute methanol 25.2 g. (0.1 mol) of α-ethyl-α-benzylthio-n-butyric acid-methylester and 8.4 g. (0.1 mol) of 4-amino-1,2,4-triazol were added and the mixture was refluxed for 24 hours. The reaction mixture was evaporated in vacuo, the residue was dissolved in 30 ml. of water and the aqueous solution was acidified (congo red) with 2 N hydrochloric acid. After standing in the cold a colorless crystalline precipitate was obtained, filtered by suction, washed with ice-water and recrystallized from 100 ml. of methanol after being dried in a desiccator. The yield of the product was 15.4 g. (51%) and the melting point was 153–4° C.

EXAMPLE 2

A mixture of 6.0 g. (0.03 mol) of 4-(phenylacetylamino)-1,2,4-triazol and 7.7 g. (0.03 mol) of tetrahydrofurfuryl-p-toluene-sulphonate was held for 2 hours in an oil bath of 130° C. After cooling the melt was dissolved in 90 ml. of water and 15 ml. of 2 N sodium hydroxide and the solution was extracted 3 times with 10 ml. portions of chloroform. After drying with sodium sulphate the combined chloroform layers were evaporated, the residue was redissolved in chloroform-hexane (1:1) and was filtered through 50 g. of aluminum oxide (Woelm neutral—Akt. 1). The filtrate was evaporated in vacuo and the residue was recrystallized from acetic ester-hexane (1:1). The yield of pure 4-(N-phenylacetyl-tetrahydrofurfuryl-amino)-1,2,4-triazol having a melting point of 99–101° C. was 5.25 g. (61%).

The starting material 4-(phenylacetyl-amino)-1,2,4-triazole can be prepared in a yield of 72% according to the method described in Example 1. The compound as purified by recrystallization in methanol had a melting point of 202–3° C.

The compounds listed in the following table were prepared according to the method as described in Example 2.

| Example No. | Product | Melting point, °C |
|---|---|---|
| 3 | 4-(N-α-napthylacetyl-tetrahydrofurfuryl-amino)-1,2,4-triazole. | 118–20 |
| 4 | 4-(N-phenylacetyl-n-propyl-amino)-1,2,4-triazole. | 140–1 |
| 5 | 4-(N-phenylacetyl-n-butyl-amino)-1,2,4-triazole. | 148–9 |

EXAMPLE 6

A mixture of 4.9 g. (0.02 mol) of 4-[N-(α-phenyl-isovaleryl)amino]-1,2,4-triazole and 2.1 ml. (0.022 mol) of dimethylsulphate was heated 2.5 hours at 160° C. The clear melt was dissolved in 40 ml. of water and 13 ml. of sodium hydroxide solution and the solution was extracted three times with 50 ml. portions of chloroform. The chloroform layers were washed with 50 ml. of water, dried with sodium sulphate and evaporated in vacuo. After recrystallisation of the residue from 50 ml. of ether 3.8 g. (74%) of 4-[N-(α-phenyl-isovaleryl)-methylamino]-1,2,4-triazole having a melting point of 126–7° C. were obtained. After a further recrystallisation from acetic ester-hexane (1:3) the melting point rose to 128–9° C.

The starting material can be prepared according to the procedure of Example 1 by refluxing for 15 hours a solution of 1.82 g. (0.079 mol) of sodium and 15.2 g. (0.079 mol) of α-phenyl-isovaleric acid methylester and 6.64 g. (0.79 mol) of 4-amino-1,2,4-triazole. After the usual treatment and recrystallization of the raw product from 120 ml. of chloroform-ether (1:3) 15.9 g. (82%) of pure 4-[N-(α-phenyl-isovaleryl)amino]-1,2,4-triazole having a melting point of 143–4° C. were obtained. The compounds listed in the following table were prepared according to the method described in Example 6.

| Example No. | Product | Melting point, °C |
|---|---|---|
| 7 | 4-[N-(α-phenyl-n-butyryl)-methylamino]-1,2,4-triazole. | 106–7 |
| 8 | 4-[N-(α-phenyl-isobutyryl)-methylamino]-1,2,4-trizole. | 127–8 |
| 9 | 4-[N-(α-phenyl-n-caproyl)-methylamino]-1,2,4-triazole. | 103–4 |
| 10 | 4-[N-(β-phenyl-isovaleryl)-methylamino]-1,2,4-triazole. | 156–8 |
| 11 | 4-[N-(γ-phenyl-n-butyryl)-methylamino]-1,2,4-triazole. | 146–8 |
| 12 | 4-[N-[α-phenyl-β-tetrahydrofuryl-(2′)-propionyl]-methylamino]-1,2,4-triazole. | 119–20 |
| 13 | 4-(N-benzoyl-methylamino)-1,2,4-triazole. | 195 |
| 14 | 4-(N-phenylacetyl-methylamino)-1,2,4-triazole. | 152–3 |
| 15 | 4-(N-α-naphtylacetyl-methylamino)-1,2,4-triazole. | 138–9 |
| 16 | 4-[N-(α-benzyloxy-isobutyryl)-methylamino]-1,2,4-triazole. | 152–3 |
| 17 | 4-[N-(α-ethyl-α-benzyloxy-n-butyryl)methyl-amino]-1,2,4-triazole. | 131–3 |

In the following table the starting materials for the Examples 3–5 and 7–17 are listed. These compounds can be prepared according to methods described in the Examples 1, 2 and 6.

| Starting material in Example No. | Product | Melting point, °C |
|---|---|---|
| 3, 15 | 4-(α-naphtylacetyl-amino)-1,2,4-triazole | 220–1 |
| 4, 5, 14 | 4-(phenylacetyl-amino)-1,2,4-triazole | 202–3 |
| 7 | 4-[N-(α-phenyl-n-butyryl)-amino]-1,2,4-triazole | 136–7 |
| 8 | 4-[N-(α-phenyl-isobutyryl)-amino]-1,2,4-triazole. | 177–8 |
| 9 | 4-[N-(α-phenyl-n-caproyl)-amino]-1,2,4-triazole | 125–8 |
| 10 | 4-[N-(β-phenyl-isovaleryl)-amino]-1,2,4-triazole. | 134–5 |
| 11 | 4-[N-(γ-phenyl-n-butyryl)-amino]-1,2,4-triazole. | 135–6 |
| 12 | 4-{N-[α-phenyl-β-tetrahydrofuryl-(2′)-propionyl]-amino}-1,2,4-triazole. | 161–2 |
| 13 | 4-(benzoyl-amino)-1,2,4-triazole. | 241–3 |
| 16 | 4-[N-(α-benzyloxy-isobutyryl)-amino]-1,2,4-triazole. | 179–80 |
| 17 | 4-[N-(α-ethyl-α-benzyloxy-n-butyryl)-amino]-1,2,4-triazole. | 127–9 |

We claim:
1. A compound of the formula

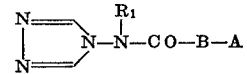

wherein
$R_1$ is selected from the group consisting of tetrahydrofurfuryl and an alkyl having from 1–4 carbon atoms,
B is an alkylene having from 1–5 carbon atoms, which alkylene may be branched or straight, and
A is selected from the group consisting of phenyl, naphthyl, benzyloxy and benzylthio.

2. A compound according to claim 1 wherein $R_1$ is methyl.

3. A compound according to claim 2 wherein B is the group

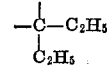

and
A is benzylthio.

4. A compound according to claim 2 wherein B is the group

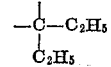

and
A is benzyloxy.

5. A compound according to claim 2 wherein B is the group

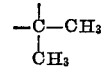

and
A is benzyloxy.

6. A compound of the formula

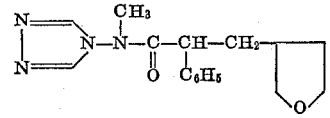

References Cited

Chemical Abstracts, Sixth Collective Index, vols. 51–55, 1957–1961, subjects SP–Z, pp. 11938s–11939s.

Wagner et al., Synthetic Organic Chemistry," (New York, 1953), p. 572.

ALTON D. ROLLINS, Primary Examiner

U.S. Cl. X.R.

424—269